United States Patent
Liu et al.

(10) Patent No.: US 11,209,371 B2
(45) Date of Patent: Dec. 28, 2021

(54) OPTICAL DETECTING DEVICE AND CALIBRATING METHOD

(71) Applicant: CHROMA ATE INC., Tao-Yuan (TW)

(72) Inventors: Yu-Hsin Liu, Tao-Yuan (TW); Kai-Chao Chan, Tao-Yuan (TW); Ming-Kai Hsueh, Tao-Yuan (TW)

(73) Assignee: CHROMA ATE INC., Tao-Yuan (CN)

( * ) Notice: Subject to any disclaimer, the term of this patent is extended or adjusted under 35 U.S.C. 154(b) by 0 days.

(21) Appl. No.: 16/687,709

(22) Filed: Nov. 19, 2019

(65) Prior Publication Data

US 2020/0191724 A1 Jun. 18, 2020

(30) Foreign Application Priority Data

Dec. 13, 2018 (TW) .................................. 107145066

(51) Int. Cl.
*G01N 21/93* (2006.01)
*G01N 21/88* (2006.01)

(52) U.S. Cl.
CPC ......... *G01N 21/93* (2013.01); *G01N 21/8806* (2013.01); *G01N 2021/8835* (2013.01)

(58) Field of Classification Search
CPC ....... G01N 2021/8835; G01N 21/8806; G01N 21/93

See application file for complete search history.

(56) References Cited

U.S. PATENT DOCUMENTS

| 5,612,903 | A | * | 3/1997 | Miller | ..................... G03B 27/73 355/32 |
| 2002/0076096 | A1 | * | 6/2002 | Silber | ....................... G01J 1/32 382/152 |
| 2005/0052530 | A1 | * | 3/2005 | Simpkins | ............... H04N 7/188 348/131 |
| 2005/0276507 | A1 | * | 12/2005 | White | ..................... G06T 5/009 382/274 |
| 2006/0159351 | A1 | * | 7/2006 | Bae | ........................ H04N 19/14 382/233 |
| 2007/0025709 | A1 | * | 2/2007 | Gladnick | ........... G01N 21/8806 396/4 |

(Continued)

FOREIGN PATENT DOCUMENTS

| CN | 101218621 A | 7/2008 |
| CN | 101242476 A | 8/2008 |

(Continued)

*Primary Examiner* — Deoram Persaud
(74) *Attorney, Agent, or Firm* — CKC & Partners Co., LLC

(57) ABSTRACT

An optical detecting device includes an image capturing device and a processor. The processor is coupled to a light source and an image capturing device. The processor is configured to adjust a light intensity of the light source for irradiating a correction object in order that a gray value of at least one image block, captured by the image capturing device, of the correction object matches a target correction value, and record a target light intensity while the target light intensity matches the target correction value; control the light source to irradiate light on a testing object with the target light intensity, and control the image capturing device to capture a testing object image of the testing object; and calculate ratios of a target gray value to the gray value of a plurality of pixels of the testing object image to obtain a mapping table.

10 Claims, 5 Drawing Sheets

(56) References Cited

U.S. PATENT DOCUMENTS

| | | | |
|---|---|---|---|
| 2008/0012959 A1* | 1/2008 | Park | H04N 5/2254 |
| | | | 348/223.1 |
| 2010/0066857 A1* | 3/2010 | Ovsiannikov | H04N 9/67 |
| | | | 348/223.1 |
| 2010/0149372 A1* | 6/2010 | Silverstein | H04N 13/15 |
| | | | 348/223.1 |
| 2010/0201894 A1 | 8/2010 | Nakayama et al. | |
| 2011/0187891 A1* | 8/2011 | Zhang | H04N 9/73 |
| | | | 348/223.1 |
| 2012/0155753 A1* | 6/2012 | Masato | H04N 1/6027 |
| | | | 382/162 |
| 2013/0308012 A1* | 11/2013 | Fukutomi | H04N 1/407 |
| | | | 348/229.1 |
| 2018/0146175 A1* | 5/2018 | Mui | G01J 3/52 |
| 2018/0375513 A1* | 12/2018 | Li | G01S 7/4813 |
| 2019/0066337 A1* | 2/2019 | Mares | H04N 9/646 |
| 2019/0191153 A1* | 6/2019 | Speigle | G09G 5/10 |
| 2019/0195510 A1* | 6/2019 | Weiss | C03C 17/007 |
| 2019/0302004 A1* | 10/2019 | Liu | G03B 21/2006 |
| 2021/0010927 A1* | 1/2021 | Shao | G02B 21/082 |
| 2021/0035483 A1* | 2/2021 | Kim | G09G 3/32 |

FOREIGN PATENT DOCUMENTS

| | | |
|---|---|---|
| CN | 101350883 A | 1/2009 |
| TW | 201723619 A | 7/2017 |

\* cited by examiner

| The gray value of each pixel of the first light source image | The red light target gray value | The first mapping table |
|---|---|---|
| 10 10 10<br>10 20 10<br>10 10 10 | 20 20 20<br>20 20 20<br>20 20 20 | 2 2 2<br>2 1 2<br>2 2 2 |

Fig. 3

| The gray value of each pixel of the second light source image | The green light target gray value | The second mapping table |
|---|---|---|
| 20 20 20<br>20 25 20<br>20 20 20 | 25 25 25<br>25 25 25<br>25 25 25 | 1.25 1.25 1.25<br>1.25 1 1.25<br>1.25 1.25 1.25 |

Fig. 4

| The gray value of each pixel of the third light source image | The blue light target gray value | The third mapping table |
|---|---|---|
| 25 25 25<br>25 40 25<br>25 25 25 | 40 40 40<br>40 40 40<br>40 40 40 | 1.6 1.6 1.6<br>1.6 1 1.6<br>1.6 1.6 1.6 |

Fig. 5

OPTICAL DETECTING DEVICE AND CALIBRATING METHOD

CROSS-REFERENCE TO RELATED APPLICATION

This application claims priority to and the benefit of Taiwan Application Serial Number 107145066, filed on Dec. 13, 2018, the entire content of which is incorporated herein by reference as if fully set forth below in its entirety and for all applicable purposes.

BACKGROUND

Field of Disclosure

The disclosure generally relates to a detecting device and method, and more particularly, to an optical detecting device and calibrating method.

Description of Related Art

With the advancement of technology, the method of examining by the naked eye whether an object has a flawed or has a defect has been replaced gradually by image recognition systems. An image sensor captures the image of the object with the image processing techniques and algorithms to find whether an object has a flaw quickly.

However, the result is that an object with a flaw will influence not only the automatic optical detection techniques but also the algorithm design or the image processing designs. Therefore, errors may occur because of the inadequately controlling parameters for the image processing.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the disclosure, an optical detecting device is disclosed. The optical detecting device includes an image capturing device and a processor. The processor is coupled to a light source and an image capturing device. The processor is configured to adjust a light intensity of the light source for irradiating a correction object in order that a gray value of at least one image block, captured by the image capturing device, of the correction object matches a target correction value, and record a target light intensity while the target light intensity matches the target correction value; control the light source to irradiate light on a testing object with the target light intensity, and control the image capturing device to capture a testing object image of the testing object; and calculate ratios of a target gray value to the gray value of a plurality of pixels of the testing object image to obtain a mapping table.

One aspect directed towards a calibrating method is disclosed, which includes adjusting a light intensity of a light source for irradiating a correction object in order that a gray value of at least one image block, captured by an image capturing device, of a correction object matches a target correction value, and recording a target light intensity while the target light intensity matches the target correction value. The method further includes controlling the light source to irradiate light on a testing object with the target light intensity, and controlling the image capturing device to capture a testing object image of the testing object. The method further includes calculating ratios of a target gray value to the gray value of a plurality of pixels of the testing object image to obtain a mapping table.

It is to be understood that both the foregoing general description and the following detailed description are by examples, and are intended to provide further explanation of the disclosure as claimed.

BRIEF DESCRIPTION OF THE DRAWINGS

FIG. 3 is a schematic diagram illustrating the gray value, the red light target gray value, and the first mapping table of the first light source image in accordance with some aspects of the present disclosure.

FIG. 4 is a schematic diagram illustrating the gray value, the green light target gray value, and the second mapping table of the second light source image in accordance with some aspects of the present disclosure.

FIG. 5 is a schematic diagram illustrating the gray value, the blue light target gray value, and the third mapping table the third light source image in accordance with some aspects of the present disclosure.

DETAILED DESCRIPTION

Figure 1:
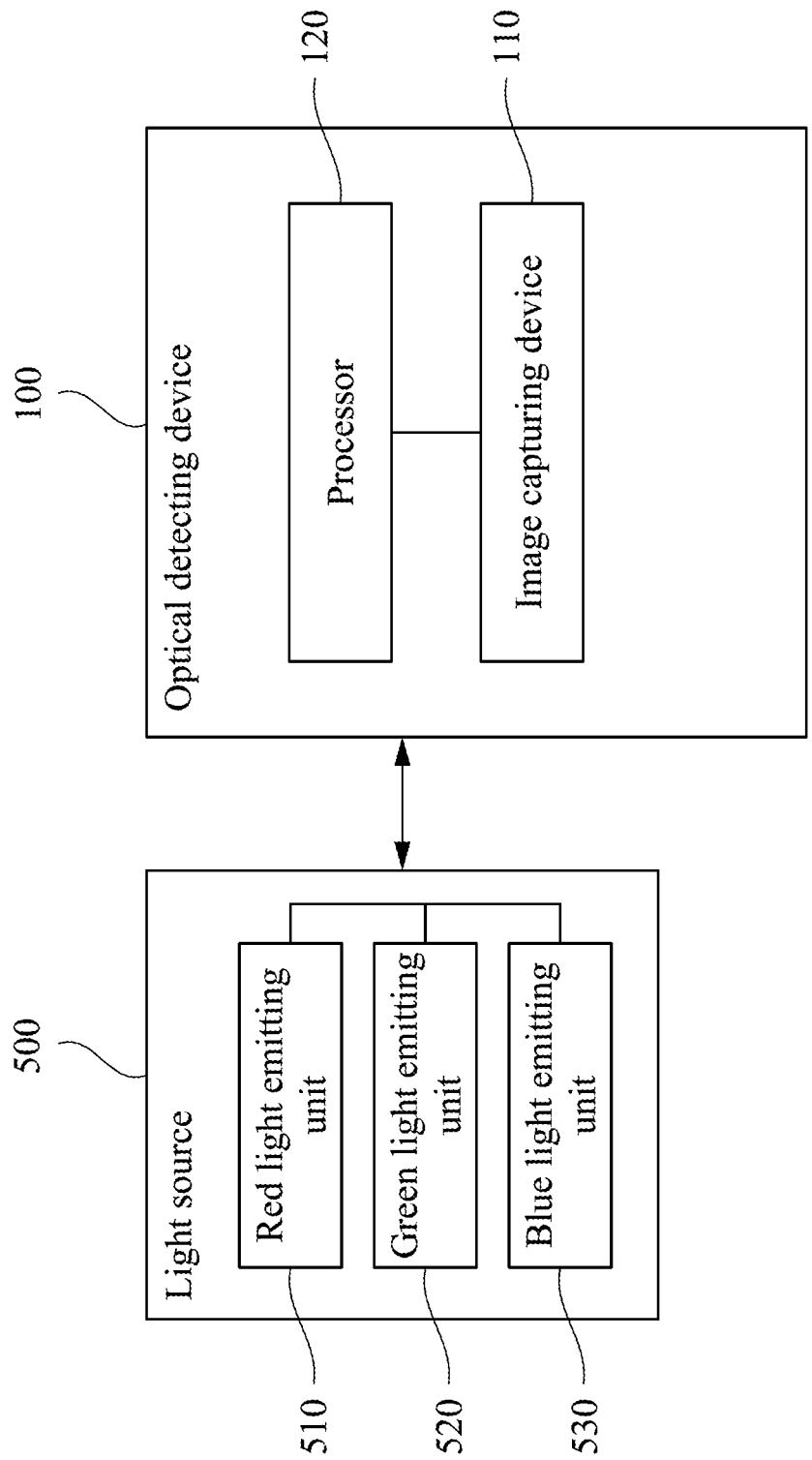
FIG. 1 is a block diagram illustrating an example of an optical detecting device in accordance with some aspects of the disclosure.

Reference will now be made in detail to the present embodiments of the disclosure, examples of which are described in the accompanying drawings. Wherever possible, the same reference numbers are used in the drawings and the description to refer to the same or like parts.

Generally, the optical detecting technique is applied for examining whether an object has defects. For example, a camera will capture an image on the object first, and then an image processing technique is applied for obtaining pixel values or related parameters of the image to determine whether the image is abnormal or not. Accordingly, it can be determined whether the object belongs to a flaw or a defect by examining whether the image is abnormal or not.

Reference is made to FIG. 1, which is a block diagram illustrating an example of an optical detecting device 100 in accordance with some aspects of the disclosure. The optical detecting device 100 includes an image capturing device 110 and a processor 120. The image capturing device 110 is coupled to the processor 120. The image capturing device 110 is configured to capture an image of a testing object (not shown) in order to generate a testing object image. The processor 120 is configured to control a light source 500. The light source 500 includes a red light emitting unit 510, a green light emitting unit 520, and a blue light emitting unit 530. The light source 500 is configured to irradiate light on the testing object for reflecting light from the testing object, in order that the image capturing device 110 can capture the testing object image.

Figure 2:
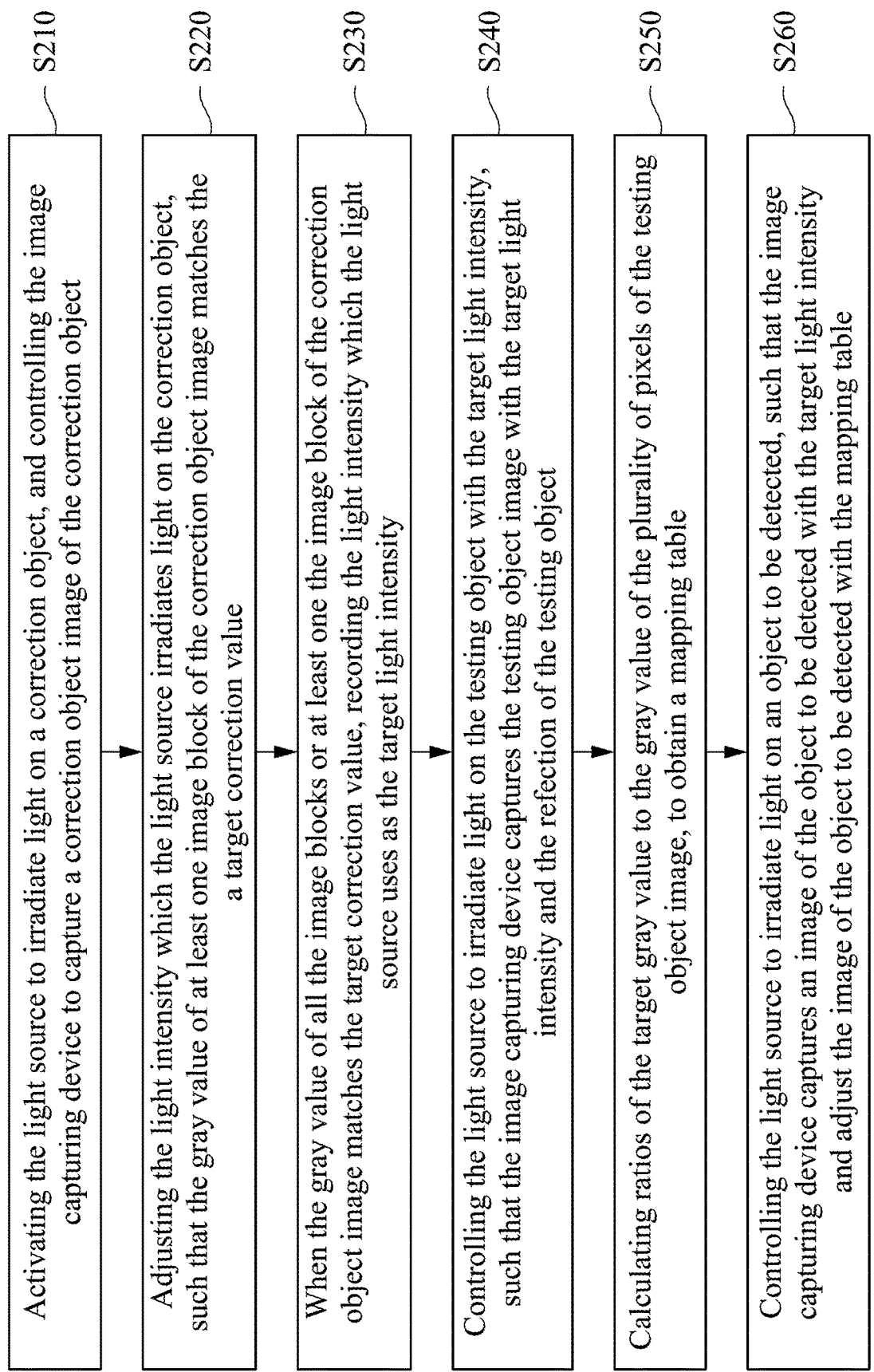
FIG. 2 is a flow chart illustrating an exemplary process for calibrating method in accordance with some aspects of the present disclosure.

Reference is made to FIG. 2, which is a flow chart illustrating an exemplary process for calibrating method in accordance with some aspects of the present disclosure. The steps of FIG. 2 are described incorporated with the optical detecting device 100 of FIG. 1 as below. As shown in FIG. 2, in step S210, the processor 120 activates the light source 500 to irradiate light on a correction object, and controls the image capturing device 110 to capture a correction object image of the correction object. The correction object can be, but not limited to, a gray card (or called a standard gray card), and cards or paper with 18% grayscale and with a flat surface. Any graph card which is used in any detecting light procedure for obtaining accurate exposure values can be applied in the present disclosure.

In some embodiments, the processor 120 activates a red light emitting unit 510 of the light source 500, such that the correction object image corresponding to the red light can be obtained. The processor 120 activates a green light emitting unit 520 of the light source 500, such that the correction object image corresponding to the green light can be obtained. The processor 120 activates a blue light emitting unit 530 of the light source 500, such that the correction object image corresponding to the blue light can be obtained. For simplifying illustrations, the correction object image corresponding to the red light is taken as an example as below, and an illustrative example of the correction object image corresponding to the green light and that of the correction object image corresponding to the blue light are similar to the illustration of the correction object image corresponding to the red light, and are not repeated herein. The correction object image can be a gray image having a plurality of pixels. For example, in the case that an image size of the correction object image is 100 pixels×100 pixels, the correction object image has 10000 pixels. In these pixels, each pixel records a gray value. Therefore, the correction object image having image size of 100 pixels×100 pixels records 10000 gray values. It should be noted that, for reducing the complexity of processing a correction image by the processor 120, the image with the image size of 100 pixels×100 pixels is processed in a form of one or more image blocks. For example, each one image block has 10 pixels×10 pixels, and hence the image having 100 pixels× 100 pixels has 100 image blocks. The processor 120 takes one image block as the unit for image processing.

In some embodiments, the gray value varies with a light intensity of the light source 500. In step S220, the processor 120 adjusts the light intensity which the light source 500 irradiates light on the correction object, such that the gray value of at least one image block of the correction object image matches the a target correction value. For example, the processor 120 controls the current value for the light intensity which the light source 500 irradiates light. The correction object reflects light because of being irradiated. The image capturing device 110 senses the reflected light and captures the correction object image.

In some embodiments, the image capturing device 110 determines whether the gray value of all of or at least one of the image blocks (such as 10 pixels×10 pixels) of the correction object image matches the target gray value or not. If the gray value mentioned above does not match the target gray value, the current which is provided to the light source 500 is adjusted such that the light intensity of the light source 500 is adjusted till the gray value of the at least one image block of the image sensed by the image capturing device 110 matches the target gray value. In some embodiments, the processor 120 adjusts the light intensity till the image capturing device 110 determines that the gray value of the center image block matches the target correction value. The target correction value can be the gray value '140'.

In some embodiments, the processor 120 controls the light intensity of the red light emitting unit 510, the green light emitting unit 520, and the blue light emitting unit 530 of the light source 500 respectively, and reads the gray value of the image or the at least one image block till the image capturing device 110 determines that the gray value matches the target gray value. For simplifying the illustrations, the red light emitting unit 510 is taken as one example of the light source for illustration below, and hence the illustrative example of the green light emitting unit 520 and the blue light emitting unit 530 are not repeated herein.

In step S230, when the gray value of all the image blocks or at least one the image block of the correction object image matches the target correction value, the processor 120 records the light intensity (such as the current value or the pulse width modulation (PWM) signal) which the light source 500 uses, and the light intensity at this time is recorded as the target light intensity. For example, the processor 120 records the light intensity which the red light emitting unit 510 uses for the following operations. In other words, the light intensity makes the gray value of all the image blocks or at least one image block of the correction object image matches the target correction value. Because the image capturing device 110 captures images on the gray card, the gray value of the at least one image block of the image will be kept at the target correction value.

In step S240, the processor 120 controls the light source 500 to irradiate light on the testing object (not shown) with the target light intensity. In some embodiments, the processor 120 controls the red light emitting unit 510, the green light emitting unit 520, and the blue light emitting unit 530 to irradiate light on the testing object with the target light intensity respectively such that the image capturing device 110 captures the testing object image corresponding to the red light, the testing object image corresponding to the green light, and the testing object image corresponding to the blue light. For simplifying the illustrations, the testing object image corresponding to the red light is taken as an example below, and the illustrative example of the testing object image corresponding to the green light and the testing object image corresponding to the blue light are not repeated herein. In some embodiments, the testing object can be, but not limited to, the solar plate (panel).

Furthermore, the image capturing device 110 captures images on the testing object image. The testing object image includes a plurality of pixels, and each pixel has a corresponding gray value. The illustrative example of the pixels of the testing object image and the corresponding gray value are similar to the illustrative example of the pixels of the correction object image and the corresponding gray value, and the description is not repeated herein.

Furthermore, in step S250, the processor 120 calculates ratios of the target gray value to the gray value of the plurality of pixels of the testing object image, to obtain a mapping table. Taking the testing object image with size of 3 pixel×3 pixel as an example, as shown in Table 1-1. The gray value of the plurality of pixels of the testing object image are a1, b1, c1, d1, e1, f1, g1, h1, i1 which pixel coordinate are from left to right and from up to bottom. When the target gray value is T (such as the gray value '140'), the contents of mapping table are, from left to right and from up to bottom, T/a1, T/b1, T/c1, T/d1, T/e1, T/f1, T/g1, T/h1, T/i1, as shown in Table 1-2. It should be noted that the gray value of the image is represented as forms of the table, and the contents of the table is the same with the contents/values of the actual image in the present disclosure.

The table is one kind of representations for showing the images, and the contents of the table represent the image contents.

TABLE 1-1

| the gray value of the image (of 3 pixels × 3 pixels) | | |
|---|---|---|
| a1 | b1 | c1 |
| d1 | e1 | f1 |
| g1 | h1 | i1 |

TABLE 1-2

| the mapping table (suitable for the image of 3 pixels × 3 pixels) | | |
|---|---|---|
| T/a1 | T/b1 | T/c1 |
| T/d1 | T/e1 | T/f1 |
| T/g1 | T/h1 | T/i1 |

In some other embodiments, the testing object image includes 90 pixels×90 pixels. When the size of one image block is 30 pixels×30 pixels, the index numbers of the image block, from left to right and from up to bottom, are B1-139, as shown in Table 2-1. The testing object image includes 9 image blocks (i.e., 3×3), and each image block includes 30 pixels×30 pixels.

TABLE 2-1

| the index numbers of the image block | | |
|---|---|---|
| B1 | B2 | B3 |
| B4 | B5 | B6 |
| B7 | B8 | B9 |

Table 2-2 is the mapping table suitable for the image block. In some embodiments, when the gray value of the pixels of the image block is the same with each other, the image block can be a manner to simplify the operations of the processor 120. The mapping table can be, but not limited to, a Flat-Field Correction table or called the FFC table.

TABLE 2-2

| mapping table (suitable for the image of 90 pixels × 90 pixels) | | |
|---|---|---|
| T/B1 | T/B2 | T/B3 |
| T/B4 | T/B5 | T/B6 |
| T/B7 | T/B8 | T/B9 |

In some embodiments, the light source 500 irradiates light, by the red light emitting unit 510, the green light emitting unit 520, and the blue light emitting unit 530 respectively, on the testing object. The image capturing device 110 captures a first light source image corresponding to the red light, a second light source image corresponding to the green light, and a third light source image corresponding to the red light. The foresaid first light source image, the second light source image, and the third light source image are gray images. The processor 120 generates, according to the gray value of the first light source image and the target gray value corresponding to the first light source, a first mapping table. The processor 120 generates, according to the gray value of the second light source image and the target gray value corresponding to the second light source, a second mapping table. The processor 120 generates, according to the gray value of the third light source image and the target gray value corresponding to the third light source, a third mapping table. The computation procedures of first mapping table, the second mapping table, and the third mapping table are described above and the computation results are shown below.

Reference is made to FIG. 3, which is a schematic diagram illustrating the gray value, the red light target gray value, and the first mapping table of the first light source image, as shown below.

As shown in FIG. 3, the first light source image is, for example, the image of 3 pixels×3 pixels, and each pixel has its corresponding gray value. The value of each element in the first mapping table is, according to each column and each row, the ratio of the red light target gray value in the table to the gray value of the pixel in the first light source image. For example, the pixel coordinates of the first light source image are, from left to right and from up to bottom, (1,1), (1,2), (1,3), (2,1), (2,2), . . . (3,3). The gray value of the pixel whose pixel coordinate is (1,1) of the first light source image is '10'. The red light target gray value corresponding to the pixel coordinate (1,1) is '20'. Hence, the value which 20 is divided by 10 is 2, and the value '2' is stored at the pixel coordinate (1,1) in the first mapping table. The gray value of the pixel coordinate (2,2) in the first light source image is 20, and the red light target gray value corresponding to the pixel coordinate (2,2) is '20'. Hence, the value which 20 is divide by 20 is 1, and the value '1' is stored at the pixel coordinate (2,2) in the first mapping table. Accordingly, the first mapping table is obtained.

Reference is made to FIG. 4, which is a schematic diagram illustrating the gray value, the green light target gray value, and the second mapping table of the second light source image.

Similar to FIG. 3 above, as shown in FIG. 4, the gray value of the pixel coordinate (1,1) in the second light source image is '20', and the green light target gray value corresponding to the pixel coordinate (1,1) is '25'. Hence, the value which 25 is divided by 20 is '1.25', and the value '1.25' is stored at the pixel coordinate (1,1) in the second mapping table. The gray value of the pixel coordinate (2,2) in the second light source image is '25', and the green light target gray value corresponding to the pixel coordinate (2,2) is '25'. Hence, the value which 25 is divide by 25 is '1', and the value '1' is stored at the at the pixel coordinate (2,2) of the second mapping table. Accordingly, the second mapping table is obtained.

Reference is made to FIG. 5, which is a schematic diagram illustrating the gray value, the blue light target gray value, and the third mapping table the third light source image.

Similar to FIG. 3 above, as shown in FIG. 5, the gray value of the pixel coordinate (1,1) in the third light source image is '25', and the blue light target gray value corresponding to the pixel coordinate (1,1) is '40'. Hence, the value which 40 is divided by 25 is '1.6', and the value '1.6' is stored at the pixel coordinate (1,1) in the third mapping table. The gray value of the pixel coordinate (2,2) in the third light source image is '40', and the blue light target gray value corresponding to the pixel coordinate (2,2) is '40'. Hence, the value which 40 is divided by 40 is '1'. Hence, the value '1' is stored at the pixel coordinate (2,2) of the third mapping table.

The pixel coordinates are represented as FIG. 3 to FIG. 5. The red light target gray value, the green light target gray value, and the blue light target gray value can be the identical or different values between each other. In the practical situation, the light absorption or the light reflection of the testing objects associated with different light wave are different due to the properties of the testing objects. For example, the solar panel is deep-blue and rigid material, and hence the reflectivity with the blue light irradiating on the solar panel is larger than the reflectivity with the red light or the green light irradiating on the solar panel. Accordingly, the gray value (such as '40') of the third light source image is larger than the gray value (such as '20') of the first light source image and the gray value (such as '25') of the second light source image.

In some embodiments, as shown in FIG. 1 and FIG. 2, the image capturing device 110 is configured to capture images on a flat region of the testing object, to obtain the region image. For example, the surface of the solar panel may be not smooth. In the procedure of generating the testing object image, the flat region of the image is copied and the flat region copied is further copied to one or more images. The processor 120 splices the one or more region images into a spliced image. The spliced image is used as the testing object image. Therefore, the gray value of the testing object image can be confirmed to be identical and the testing object image can be confirmed to be ideal without defects. The size of the foresaid region image can be smaller than the size of the testing object image.

Furthermore, the light source 500 is activated such that the red light emitting unit 510 irradiates light on the correction object (such as the gray card). The light intensity of the red light emitting unit 510 is controlled in order that the gray value of the correction object image can be used as a first target correction value (such as the gray value '140'), and the first target correction value is recorded as the target light intensity of the red light. Similarly, the green light emitting unit 520 irradiates light on the correction object. The light intensity of the green light emitting unit 520 is controlled in order that the gray value of the correction object image can be used as a second target correction value, and the second target correction value is recorded as the target light intensity of the green light. Similarly, the blue light emitting unit 530 irradiates light on the correction object. The light intensity of the blue light emitting unit 530 is controlled in order that the gray value of the correction object image can be used as a third target correction value, and the third target light intensity is recorded as the target light intensity of the blue light. In some embodiments, the first target correction value, the second target correction value, and the third target correction value are the same values. In some embodiments, the image capturing device 110 senses the image whose gray value is '140' when the red light emitting unit 510, the green light emitting unit 520, and the blue light emitting unit 530 irradiate light at the same time, such that the image capturing device 110 executes the calibration procedure for white balance.

In step S260, the processor 120 controls the light source 500 to irradiate light on an object to be detected (not shown) with the foresaid target light intensity. The image capturing device 110 captures an image of the object to be detected, and the gray value of the image of the object to be detected. Furthermore, the processor 120 adjusts the gray value of the image of the object to be detected according to the mapping table. The light source 500 irradiates light on the object to be detected such that the image capturing device 110 captures the image of the object to be detected. The processor 120 multiplies the gray value of the image of the object to be detected by each element of the mapping table and the result, which is an adjusted gray value, is obtained accordingly. For example, the gray value of the image of the object to be detected, which the red light emitting unit 510 irradiates light on the object to be detected, is multiplied by the content of Table 3. The gray value of the image of the object to be detected, which the green light emitting unit 520 irradiates light on the object to be detected, is multiplied by the content of Table 4. The gray value of the image of the object to be detected, which the blue light emitting unit 530 irradiates light on the object to be detected, is multiplied by the content of Table 5. Taking the image of the object to be detected whose image size of 3 pixels×3 pixels as an example. When the gray value at the pixel coordinate (1,1) of the image of the object to be detected is 'a2', the gray value 'a2' multiplied by the value at the pixel coordinate (1,1) in Table 3, i.e., '2', equals '2×a2'. By performing the calculations for all pixels of the image of the object to be detected, an adjusted image of the object to be detected is obtained. The gray value of at least one block of the adjusted image of the object to be detected (such as the image block at the center of the image of the object to be detected) matches the target gray value. In some embodiments, the gray value of the image block at the center of the adjusted image of the object to be detected is altered to be the ideal gray value '140'.

Therefore, if the same or similar object is to be detected whether there is any detect on it (such the solar panel or other type of circuit board), the light intensity of the correction object will be configured first. The mapping table of the testing object will be configured according to the foresaid configured light intensity of the object. The white balance is modified, and then the image of the object is adjusted according to the foresaid light intensity and the configured mapping table. Therefore, the image can be amended to the ideal gray value '140', and the difference between the gray values of all pixels of the whole image is reduced.

Accordingly, comparing with the procedure of using, merely, the gray card to calibrate the exposure value, the optical detecting device 100 and the calibrating method of the present disclosure creates the mapping table related to the testing object having different properties. Furthermore, the image is adjusted by the mapping table and the target light intensity of the light source 500, such that the gray value of the image, of the whole surface or the center part of the plane, of the object to be detected presents as the line distribution. Therefore, the difference of the gray value of the adjusted image of the object to be detected will be small such that the error probability of the optical detection will be reduced and the accuracy that the optical detecting device 100 detects defects of images will be increased.

It is to be understood that the specific order or hierarchy of steps in the methods disclosed is an illustrative example of processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. The novel algorithms described herein may also be efficiently implemented in software and/or embedded in hardware.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. An optical detecting device, comprising:
an image capturing device; and a processor coupled to a light source and the image capturing device, wherein the processor is configured to:

adjust a light intensity of the light source for irradiating a correction object, which is a gray card, corresponding to a target correction value to generating a target light intensity of the light source in order that a gray value of at least one image block, captured by the image capturing device, of the correction object matches the target correction value, and record the target light intensity while the target light intensity is used such that the gray value of at least one image block matches the target correction value;

control the light source to irradiate light on a testing object with the target light intensity, and control the image capturing device to capture a testing object image of the testing object, wherein the testing object is different from the correction object; and calculate ratios of a target gray value to the gray value of a plurality of pixels of the testing object image to obtain a mapping table which comprises the ratios of the plurality of pixels corresponding to an image size.

2. The optical detecting device of claim 1, wherein the image capturing device is further configured to capture a flat region of the testing object to obtain a region image, and the processor is configured to copy the region image and splice a plurality of the region images copied into the testing object image, wherein the region image is smaller than the testing object image.

3. The optical detecting device of claim 1, wherein the light source comprises a red light emitting unit, a green light emitting unit, and a blue light emitting unit, and the processor is configured to control the red light emitting unit, the green light emitting unit, and the blue light emitting unit to irradiate light on the testing object with the target light intensity of the red light emitting unit, the target light intensity of the green light emitting unit, and the target light intensity of the blue light emitting unit respectively, such that the image capturing device captures the testing object image of the testing object respectively, wherein the testing object image comprises a first light source image corresponding to the red light emitting unit, a second light source image corresponding to the green light emitting unit, and a third light source image corresponding to the blue light emitting unit.

4. The optical detecting device of claim 3, wherein the target gray value comprises a red light target gray value, a green light target gray value, and a blue light target gray value, and the processor is further configured to:

calculate, according to a plurality of pixel coordinates of the first light source image, the ratios of the red light target gray value to the gray value of the plurality of pixel coordinates of the first light source image, to obtain the mapping table correspondingly;

calculate, according to a plurality of pixel coordinates of the second light source image, the ratios of the green light target gray value to the gray value of the plurality of pixel coordinates of the second light source image, to obtain the mapping table correspondingly; and calculate, according to a plurality of pixel coordinates of the third light source image, the ratios of the blue light target gray value to the gray value of the plurality of pixel coordinates of the third light source image, to obtain the mapping table correspondingly.

5. The optical detecting device of claim 1, wherein the processor is further configured to:

control the light source to emit light on an object to be detected with the target light intensity, and control the image capturing device to capture an image of the object to be detected; and adjust, according to the mapping table, the gray value of a plurality of pixels of the image of the object to be detected, such that the gray value of at least one image block of the image of the object to be detected matches the target gray value.

6. A calibrating method, comprising:

adjusting a light intensity of a light source for irradiating a correction object, which is a gray card, corresponding to a target correction value to generating a target light intensity of the light source in order that a gray value of at least one image block, captured by an image capturing device, of a correction object matches a target correction value, and recording the target light intensity is used such that the gray value of at least one image block while the target light intensity matches the target correction value;

controlling the light source to irradiate light on a testing object with the target light intensity, and controlling the image capturing device to capture a testing object image of the testing object, wherein the testing object is different from the correction object; and calculating ratios of a target gray value to the gray value of a plurality of pixels of the testing object image to obtain a mapping table which comprises the ratios of the plurality of pixels corresponding to an image size.

7. The calibrating method of claim 6, further comprising:

capturing, by the image capturing device, a flat region of the testing object to obtain a region image, and copying the region image to splice a plurality of the region images copied into the testing object image, wherein the region image is smaller than the testing object image.

8. The calibrating method of claim 6, wherein the light source comprises a red light emitting unit, a green light emitting unit, and a blue light emitting unit, and the calibrating method further comprises:

controlling the red light emitting unit, the green light emitting unit, and the blue light emitting unit to irradiate light on the testing object with the target light intensity of the red light emitting unit, the target light intensity of the green light emitting unit, and the target light intensity of the blue light emitting unit respectively, such that the testing object image of the testing object is captured by the image capturing device respectively, wherein the testing object image comprises a first light source image corresponding to the red light emitting unit, a second light source image corresponding the green light emitting unit, and a third light source image corresponding the blue light emitting unit.

9. The calibrating method of claim 8, wherein the target gray value comprises a red light target gray value, a green light target gray value, and a blue light target gray value, and the calibrating method further comprises:

calculating, according to a plurality of pixel coordinates of the first light source image, the ratios of the red light target gray value to the gray value of the plurality of pixel coordinates of the first light source image, to obtain the mapping table correspondingly;

calculating, according to a plurality of pixel coordinates of the second light source image, the ratios of the green light target gray value to the gray value of the plurality of pixel coordinates of the second light source image, to obtain the mapping table correspondingly; and calculating, according to a plurality of pixel coordinates of the third light source image, the ratios of the blue light target gray value to the gray value of the plurality of pixel coordinates of the third light source image, to obtain the mapping table correspondingly.

10. The calibrating method of claim 6, further comprising:

controlling the light source to emit light on an object to be detected with the target light intensity, and controlling the image capturing device to capture an image of the object to be detected; and adjusting, according to the mapping table, the gray value of a plurality of pixels of the image of the object to be detected, such that the gray value of at least one image block of the image of the object to be detected matches the target gray value.

\* \* \* \* \*